United States Patent [19]

Ward, III

[11] 4,115,514

[45] Sep. 19, 1978

[54] SEPARATION OF HYDROGEN SULFIDE FROM GAS MIXTURE INCLUDING CARBON DIOXIDE

[75] Inventor: William J. Ward, III, Schenectady, N.Y.

[73] Assignee: General Electric Company, Schenectady, N.Y.

[21] Appl. No.: 796,017

[22] Filed: May 11, 1977

Related U.S. Application Data

[62] Division of Ser. No. 599,871, Jul. 28, 1975.

[51] Int. Cl.$^2$ ............................................. B01D 53/34
[52] U.S. Cl. .................................. 423/232; 423/210; 55/16
[58] Field of Search ...................... 423/210, 220, 232; 55/16

[56] References Cited

U.S. PATENT DOCUMENTS 3,624,983 12/1971 Ward et al. ............................. 55/16
3,819,806 6/1974 Ward et al. ............................ 423/220

Primary Examiner—Earl C. Thomas
Attorney, Agent, or Firm—Nathan D. Herkamp; Joseph T. Cohen; Leo T. MaLossi

[57] ABSTRACT

Hydrogen sulfide is removed from a mixture of gases including carbon dioxide by passing the mixture over an assembly comprising a pair of immobilized liquid membranes of carbonate/bicarbonate solution separated by a gas permeable barrier of hydrophobic microporous material. Because hydrogen sulfide transport through the membranes is diffusion limited while carbon dioxide transport therethrough is reaction rate limited, the assembly exhibits reduced permeability to carbon dioxide and essentially unchanged high permeability to hydrogen sulfide compared to a single immobilized liquid membrane of thickness equal to total thickness of the membranes in the assembly. Hydrogen sulfide thus passes through the assembly more selectively than carbon dioxide.

3 Claims, 2 Drawing Figures

SEPARATION OF HYDROGEN SULFIDE FROM GAS MIXTURE INCLUDING CARBON DIOXIDE

This is a division of application Ser. No. 599,871, filed July 28, 1975.

INTRODUCTION

This invention relates to separation of one gas from another, and more particularly to a method and apparatus for separating hydrogen sulfide from a mixture of gases including carbon dioxide, such as gasified coal.

Avoidance of air pollution makes it essential to minimize release of sulfur dioxide into the atmosphere. By removing hydrogen sulfide from coal gas utilized in a combustion process, oxidation of the hydrogen sulfide to sulfur dioxide is avoided. Where combustion is to take place in a gas turbine, moreover, it is desirable to remove as little carbon dioxide as possible since, in pressurized coal gas, $CO_2$ is a valuable working fluid which should be put through the turbine to maximize its efficiency. Moreover the sour off-gas from $H_2S$ removal processes is normally converted to sulfur in a Claus plant of the type described in R. N. Shreeve, Chemical Process Industries, (McGraw-Hill, 1967) at page 325. The Claus plant is a major cost item of the cleanup process, and cost of the plant is dependent on concentration of $H_2S$ supplied to the plant. Additionally, the $H_2S$ concentration affects the size and cost of the Claus plant off-gas cleaning process. As an overall effect, therefore, increased $H_2S$ concentration results in a lower cost of converting $H_2S$ to elemental sulfur.

The present invention is directed to removal of hydrogen sulfide from a mixture of gases prior to combustion of the gases, in order to minimize evolution of sulfur dioxide. The invention employs immobilized liquid membranes comprised of $CO_3^=/HCO_3^-$ solution in an arrangement exhibiting improved selectivity to $H_2S$ by virtue of reduced permeability to $CO_2$. This result is achieved because $CO_2$ transport through each membrane is reaction rate limited, as indicated in Ward et al. U.S. Pat. No. 3,396,510, issued Aug. 13, 1968 and assigned to the instant assignee, while $H_2S$ transport therethrough is diffusion limited, as indicated in Ward et al. U.S. Pat. No. 3,819,806, issued June 25, 1974 and assigned to the instant assignee, the description thereof being incorporated herein by reference. By combining a pair of immobilized liquid membranes having a total thickness equal to that of any single immobilized liquid membrane, and separating each membrane of the pair by a gas permeable barrier or gas gap, $H_2S$ transport through the resulting assembly is unaffected in relation to $H_2S$ transport through the single membrane, but $CO_2$ transport through the assembly is reduced with respect to $CO_2$ transport through the single membrane. The gas permeable barrier is selected in order to provide high permeability to gases relative to permeability of the liquid membrane.

Accordingly, one object of the invention is to provide a method and apparatus for separating $H_2S$ with a high degree of selectivity from a mixture of gases including $CO_2$.

Another object is to provide a method and apparatus for improving separation of $H_2S$ from a mixture of gases including $CO_2$ by impeding permeation of $CO_2$ through an immobilized liquid membrane assembly.

Another object is to provide a structure permeable to $H_2S$ but requiring $CO_2$ to react individually with each of a plurality of immobilized liquid membranes during passage of $CO_2$ through the structure.

Briefly, in accordance with one aspect of the invention, a method of selectively removing hydrogen sulfide from a mixture of gases including carbon dioxide comprises contacting a first immobilized liquid membrane with the mixture to allow facilitated transport of hydrogen sulfide through the first membrane to a porous gas permeable barrier, passing gases emerging from the first membrane through the gas permeable barrier, and contacting a second immobilized liquid membrane with gases emerging from the gas permeable barrier to allow facilitated transport of hydrogen sulfide through the second membrane. Since carbon dioxide transport through the membrane is reaction rate limited, even at temperatures as high as 100° C., carbon dioxide transport is halved by employment of the two immobilized liquid membranes instead of one equal in thickness to the total thickness of the two, while hydrogen sulfide transport, being diffusion limited, is unaffected by interposition of the gas permeable barrier.

In accordance with another aspect of the invention, apparatus for selectively removing hydrogen sulfide from a mixture of gases including carbon dioxide comprises first and second immobilized liquid membranes, each of the membranes being comprised of $CO_3^=/HCO_3^-$ solution. A porous gas permeable barrier is situated between, and in intimate contact with, each of the first and second immobilized liquid membranes. Means are provided for conducting a flow of the mixture of gases over a surface of the first immobilized liquid membrane, and means are provided for removing gases emerging from the second immobilized liquid membrane.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION

Figure 1:
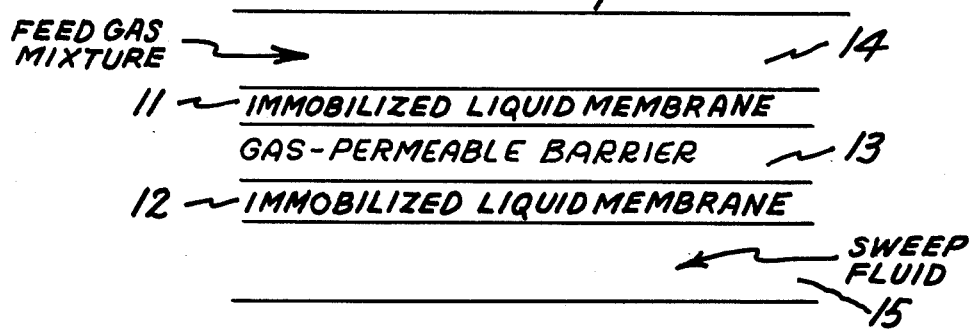
FIG. 1 is a schematic diagram of one embodiment of the invention.

In FIG. 1, an immobilized liquid membrane assembly 10 is illustrated as comprising first and second immobilized liquid membranes (ILMs) 11 and 12 separated by a gas permeable barrier 13. A continuously-flowing feed gas mixture containing both hydrogen sulfide and carbon dioxide, such as is present in gasified coal, is admitted into a flow chamber 14 which conducts the flow of feed gas along, and thereby brings it into contact with, the outer surface of ILM 11. A continuously-flowing sweep fluid is passed through a flow chamber 15 so as to flow along, and thereby contact, the outer surface of ILM 12. In abandoned Ward application Ser. No. 599,872, filed July 28, 1975 and assigned to the instant assignee, a liquid sweep which reacts with $H_2S$ is employed to remove $H_2S$ from an immobilized liquid membrane assembly, while a gaseous sweep is employed in the present invention.

Composition of ILMs 11 and 12 is described in detail in the aforementioned Ward et al. U.S. Pat. No.

3,396,510, issued Aug. 13, 1968 and Ward et al. U.S. Pat. No. 3,819,806, issued June 25, 1974, both patents being assigned to the instant assignee, and the descriptions therein being incorporated herein by reference. ILMs have previously been utilized for removing $H_2S$ from gas streams, as described and claimed in the latter patent.

In one embodiment, the ILM referred to in Ward et al. U.S. Pat. No. 3,819,806 and employed in the present invention comprises a matrix layer having interconnecting micropores occupied by an aqueous solution. Solutions used to make ILMs of this type have been prepared from distilled water and a mixture of potassium carbonate and potassium bicarbonate, as stated in U.S. Pat. No. 3,819,806. The microporous matrix is made of a hydrophilic material (i.e., wet by the particular solution employed). Commercially available microporous materials useful for this purpose are those sold, for example, under the trademark "Solvinert" by Millipore Corporation, Bedford, Mass., and under the trademark "Acropor" by Gelman Instrument Company, Ann Arbor, Mich.

In the case of the $CO_3^=/HCO_3^-$ system, it is necessary to maintain proper carbon dioxide partial pressure in the feed gas stream in contact with the membrane to prevent substantial depletion of the $HCO_3^-$ ion, which is required to accomplish proton ($H^+$) transfer across the ILM. It was pointed out in U.S. Pat. No. 3,819,806 that in the case of the carbonate/bicarbonate ILM, average distribution of $HCO_3^-$ and $CO_3^=$ will be determined by average partial pressure of $CO_2$ on both sides of the membrane and should be such that concentration of $HCO_3^-$ and $CO_3^=$ will be of the same order of magnitude (e.g., $CO_2$ partial pressure of the order of 0.01 atmospheres at 23° C.). Due to the $H_2S$ pressure difference across the ILM, significant concentration gradients in $HCO_3^-$ and $CO_3^=$ are established in the membrane and are not altered significantly by presence of $CO_2$ adjacent the membrane because hydrolysis of $CO_2$ is a slow reaction relative to speed of diffusion in the system.

The membrane assembly illustrated in FIG. 1 is less permeable to $CO_2$, and thus more selective to $H_2S$, than a single $CO_3^=/HCO_3^-$ ILM of thickness equal to the total thickness of the two ILMs shown in FIG. 1. Facilitated $CO_2$ transport through such ILM is reaction rate limited, even at 100° C., while the facilitated $H_2S$ transport reactions, which are reversible, occur instantaneously so that net $H_2S$ transport through the ILM is diffusion limited. If two ILMs of 4 mils total thickness are arranged in side-by-side intimate contact, they provide the same gas separation results as a single ILM 4 mils thick. By adding between the two ILMs a several mils thick gas gap or barrier 13 of hydrophobic microporous material exhibiting high permeability to gases relative to ILMs, such as Teflon, a trademark of E. I. du Pont de Nemours and Company, Wilmington, Del., for fluorinated hydrocarbon polymers, typically of the type designated "GORE-TEX", a trademark of W. L. Gore & Associates, Inc., Newark, Del. , $H_2S$ transport through the immobilized liquid membrane assembly is unaffected; however $CO_2$ transport through the assembly is halved, since the reversible slow reactions which determine $CO_2$ permeability through an ILM, specifically identified in U.S. Pat. No. 3,396,510, must occur twice for $CO_2$ to pass through the double membrane structure. Selectively of the immobilized liquid membrane assembly to $H_2S$ is thereby doubled.

The sweep fluid, which may typically comprise air or steam, for example, maintains low $H_2S$ partial pressure on the outlet side of immobilized liquid membrane assembly 10 by carrying away $H_2S$ that has passed through the ILM assembly, while the feed gas, typically supplied at relatively high pressure, maintains high $H_2S$ partial pressure on the inlet side of the membrane. Thus a partial pressure differential of $H_2S$ is maintained across ILM assembly 10 so that continuous facilitated $H_2S$ transport across each ILM of the membrane assembly occurs. In this fashion, $H_2S$ is removed from the feed gas.

Figure 2:
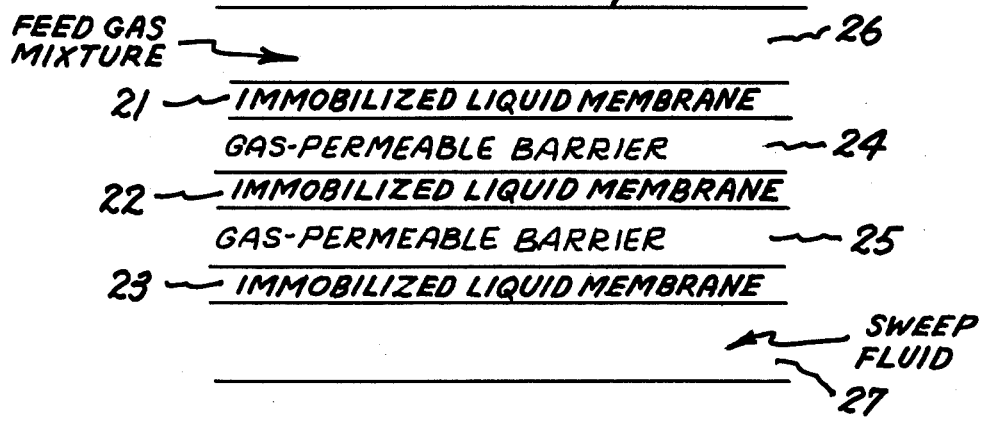
FIG. 2 is a schematic diagram of a second embodiment of the invention.

$CO_2$ permeability may be further reduced by employing an ILM assembly with multiple gas gaps, such as ILM assembly 20, shown in FIG. 2, which comprises three ILMs 21, 22 and 23, with a first gas permeable barrier 24 between ILMs 21 and 22 and a second gas permeable barrier 25 between ILMs 22 and 23. A feed gas mixture containing both $H_2S$ and $CO_2$ is conducted along the outer surface of membrane 21 by flow chamber 26. $H_2S$ is carried away by a sweep fluid through flow chamber 27. By using this structure, $CO_2$ transport through the assembly is reduced to one-third that through any single ILM of thickness equal to total thickness of ILMs 21, 22 and 23 since the reversible slow reactions which determine $CO_2$ permeability must occur three times for $CO_2$ to pass entirely through the triple membrane assembly. Selectivity of this immobilized liquid membrane assembly to $H_2S$ contained in feed gas entering flow chamber 26 is thereby tripled.

A practical limit on the number of ILMs that may be assembled for $H_2S$ removal is determined by the cost of providing the gas permeable barriers, and the fact that total ILM thickness should not exceed approximately 5 mils to carry acceptable $H_2S$ flux. In event that two gas permeable barriers and three ILMs are employed, as in the embodiment of FIG. 2, 90% $H_2S$ removal from gasified, 4.5% sulfur coal at 300 p.s.i. pressure and about 100° C. temperature results in feed gas to the Claus plant which may comprise 70–90% $H_2S$ rather than 30–50% for a single layer immobilized liquid membrane assembly. Substantial cost savings can thereby be realized on a large Claus plant, such as required for a large coal gasification power plant installation.

The foregoing describes a method and apparatus for separating hydrogen sulfide with a high degree of selectivity from a mixture of gases including carbon dioxide. Improved separation of hydrogen sulfide from the mixture of gases is realized by impeding permeation of carbon dioxide through an immobilized liquid membrane assembly, which assembly is permeable to hydrogen sulfide but requires carbon dioxide to react individually with each of a plurality of immobilized liquid membranes during its passage therethrough.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A method of selectively removing hydrogen sulfide from a mixture of gases including carbon dioxide, comprising:
    contacting a first immobilized liquid membrane with said mixture, said first immobilized liquid membrane consisting of a carbonate bicarbonate mixture to allow facilitated transport of hydrogen sulfide through said first membrane to a porous gas-permeable barrier;

passing gases emerging from said first membrane through said gas-permeable barrier; and contacting a second immobilized liquid membrane with gases emerging from said gas-permeable barrier, said second immobilized liquid membrane consisting of a carbonate/bicarbonate mixture to allow facilitated transport of hydrogen sulfide emerging from said gas-permeable barrier through said second membrane.

2. The method of claim 1 including the step of maintaining partial pressure of hydrogen sulfide emerging from said second membrane at a lower value than the partial pressure of hydrogen sulfide in said mixture of gases.

3. The method of claim 1 including the step of continually sweeping gases emerging from said second membrane with a flow of sweep fluid.

* * * * *